United States Patent [19]

Retzer

[11] Patent Number: 5,737,357
[45] Date of Patent: Apr. 7, 1998

[54] APPARATUS AND METHOD FOR DATA PATTERN SENSITIVITY CORRECTION

[75] Inventor: Michael H. Retzer, Palatine, Ill.

[73] Assignee: Motorola, Inc., Schaumburg, Ill.

[21] Appl. No.: 525,808

[22] Filed: Sep. 8, 1995

[51] Int. Cl.$^6$ .............................. H04B 15/00; H04L 1/18; H04L 25/06; H04L 25/08

[52] U.S. Cl. .......................... 375/200; 375/254; 375/285; 375/296; 375/206; 371/33

[58] Field of Search .................................. 375/200, 206, 375/253, 254, 259, 285, 292, 296; 371/32, 33, 48, 57.1; 341/109, 58, 59

[56] References Cited

U.S. PATENT DOCUMENTS 3,475,723  10/1969  Burton et al. ........................ 375/254
5,335,247   8/1994  Olmstead ............................. 375/200

Primary Examiner—Stephen Chin
Assistant Examiner—Jeffrey W. Gluck
Attorney, Agent, or Firm—J. Ray Wood

[57] ABSTRACT

An apparatus is disclosed which is adaptable for indicating communication failures and eliminating an undesired pattern of physical values of a generated signal, the signal having physical values responsive to a sequence of information. The apparatus includes a protocol sequencer, responsive to the sequence of information and to the communication failure indications, and providing RESET and RETRY control signals; a framing flag generator, responsive to the RESET signal and providing a variable length framing flag, the length of the framing flag being dependent on the RETRY signal; a multiplex switch, responsive to the RETRY and RESET signals for generating a concatenation of the framing flag and sequence of information; a whitener generator, responsive to the RESET signal, for providing a known sequence of values; and a multiplier, for multiplying said concatenation of said framing flag and the sequence of information with the known sequence of whitener values.

2 Claims, 2 Drawing Sheets

APPARATUS AND METHOD FOR DATA PATTERN SENSITIVITY CORRECTION

FIELD OF THE INVENTION

This invention deals with data signal modulation and more specifically but not limited to adaptively eliminating data pattern sensitivity in a radio frequency transmitted data modulation.

BACKGROUND OF THE INVENTION

The need for efficient, low-cost, data communications continues to increase, not only in the traditional applications of cabled or microwave high speed telecommunications and local or wide area computer networks, but in the emerging applications of personal communications of data or digitized voice from handheld wireless devices. These wireless devices employ a variety of techniques and technologies to implement data communications, including but not limited to, radio and infrared. These media, as compared with traditional wired data systems, offer increased challenges to the designer, principally because of relatively narrow available information bandwidths and additive systematic or random errors. Furthermore, these personal data systems will often, but not necessarily, be packet implementations, where the media is time shared among a number of devices each sending relatively short bursts of data. In packet data systems there are design tradeoffs between the overhead carried in each packet for synchronization, the amount of actual information carried in each packet, and the reliability of receiving the information without error. The invention described here offers a way to improve the reliability of correctly receiving the transmitted data given bandwidth, systematic and random errors, and synchronization tradeoffs inherent with wireless data systems.

In data communications systems with limited information bandwidth it is well known that some sort of Non-Return to Zero (NRZ) modulation scheme offers the optimum steady state performance throughput. In these NRZ schemes, or derivative similar schemes, the information is encoded as some offset from known reference levels. This could be, for example, a voltage value that is greater than some reference could represent a data value of 1, and less than some reference could represent a data value of 0. Similarly, the reference could be a nominal value of frequency, with greater frequency values representing a data value of 1, and lesser frequency values representing a data value of 0. Other techniques of data communication similarly exist, where the data information is encoded as the value of some physical property relative to some reference value; this could be voltage or frequency as used in these examples, or alternatively, light intensity, sinusoidal phase angle, or other similar physical measurable property. Furthermore, the notion of encoding data values as physically measurable offsets relative to some reference level, can be extended from the binary examples used here to multi-level schemes requiting a plurality of reference levels. The task of a data receiver in systems such as this is to recover the encoded data information by making a comparison of some physical measurement relative to some reference level. A fundamental difficulty exists with any of these schemes in that a receiver designed to recover the encoded data values must first determine the value of the reference level used to make the comparison. In traditional wired systems, this reference level can often be a fixed unchanging value, which makes the comparison at the receiver an easy task. In many wireless, and some wired, systems, however, the determination of this reference level must be made at the receiver by some sort of averaging over intervals of the received physical values. This determination is necessary because of systematic channel impairments, such as attenuation, carrier frequency offset, voltage offset, etc., which preclude fixed references. For example, in typical radio frequency implementations, the reference will vary with carrier frequency errors, and furthermore these errors may be different between each unique transmitter/receiver pair, necessitating some rapidly adaptive scheme for reference recovery. Many techniques exist for the rapid estimation of reference level at the data receiver, such as U.S. Pat. No. 3,846,710 to Chapman.

Any adaptive method for determining the reference level in a data system is subject to intersymbol interference pattern sensitivity errors due to variation in the long term average value of the received waveform. This is particularly the case in partial response type schemes, such as heavily baseband filtered GMSK, where the probability of error for symbols of run length one is significantly greater than for symbols having longer run length; long term variations in the average signal level distort the adaptive reference level, causing the short run symbols to be received with poorer (or negative!) error margins. Typically in such systems the transmitted data stream will be multiplied by a pseudorandom "whitener" sequence in order to minimize the average variation in long term average. But even with whitening, there may be some combination of information bits plus whitener bits that cause unacceptable pattern performance. Some bits in the stream will have a higher probability of error than others.

In data communications systems such as this, higher layer protocols will attempt to retry transmissions if they are not received correctly without error, according to one of many well known acknowledgment/retry protocols. In data schemes that do not use a whitener, or in schemes which continually reset the whitener to the same sequence for every retry attempt, it is likely that if pattern sensitivity caused an error on the first attempt, the same pattern will cause errors on all subsequent retries. Examples of a fixed whitening sequence that resets on every transmission block include the IEEE 802.11 wireless LAN (local area network) specification, available from the Institute of Electrical and Electronics Engineers, Inc. (IEEE), 345 E. 47th Street, New York N.Y., and the Cellular Digital Packet Data (CDPD) specification, available from the CDPD Forum, Inc., 401 N. Michigan Avenue, Chicago, Ill., 60611-4276. For severe pattern error, it will be likely that any retries will also fail. Clearly a need exists for a method and apparatus that eliminates repetitive pattern errors on subsequent transmission retries.

SUMMARY OF THE INVENTION

According a first aspect of the invention, an apparatus is provided, which is adaptable to communication failure indications, for eliminating an undesired pattern of physical values of a generated signal. Such signal having physical values which is responsive to a sequence of information data. The apparatus comprises a protocol sequencer, a flaming flag generator, a multiplex switch, a whitener generator and a multiplying means.

The protocol sequencer, which is responsive to the sequence of information data and to the communication failure indications, provides a RESET control signal and a RETRY control signal. The flaming flag generator, which is responsive to the RESET control signal, provides a variable length flaming flag. The length of the flaming flag is dependent on the RETRY signal. The multiplex switch, which is responsive to the RETRY control signal and to the RESET control signal, generates the concatenation of the flaming flag and the sequence of information data. The whitener generator, which is responsive to the RESET control signal, provides a known sequence of values. The multiplying means multiplies the concatenation of the flaming flag and the sequence of information data with the known sequence of whitener values.

According to a second aspect of the invention, a method is provided for eliminating an undesired pattern of physical values of a generated signal. Such method generates a first sequence of information dam; concatenates a variable length framing flag onto the first sequence resulting in a second sequence of data, the framing flag length being responsive to a retry control signal; and multiplies the second sequence with a whitener sequence.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Figure 1:
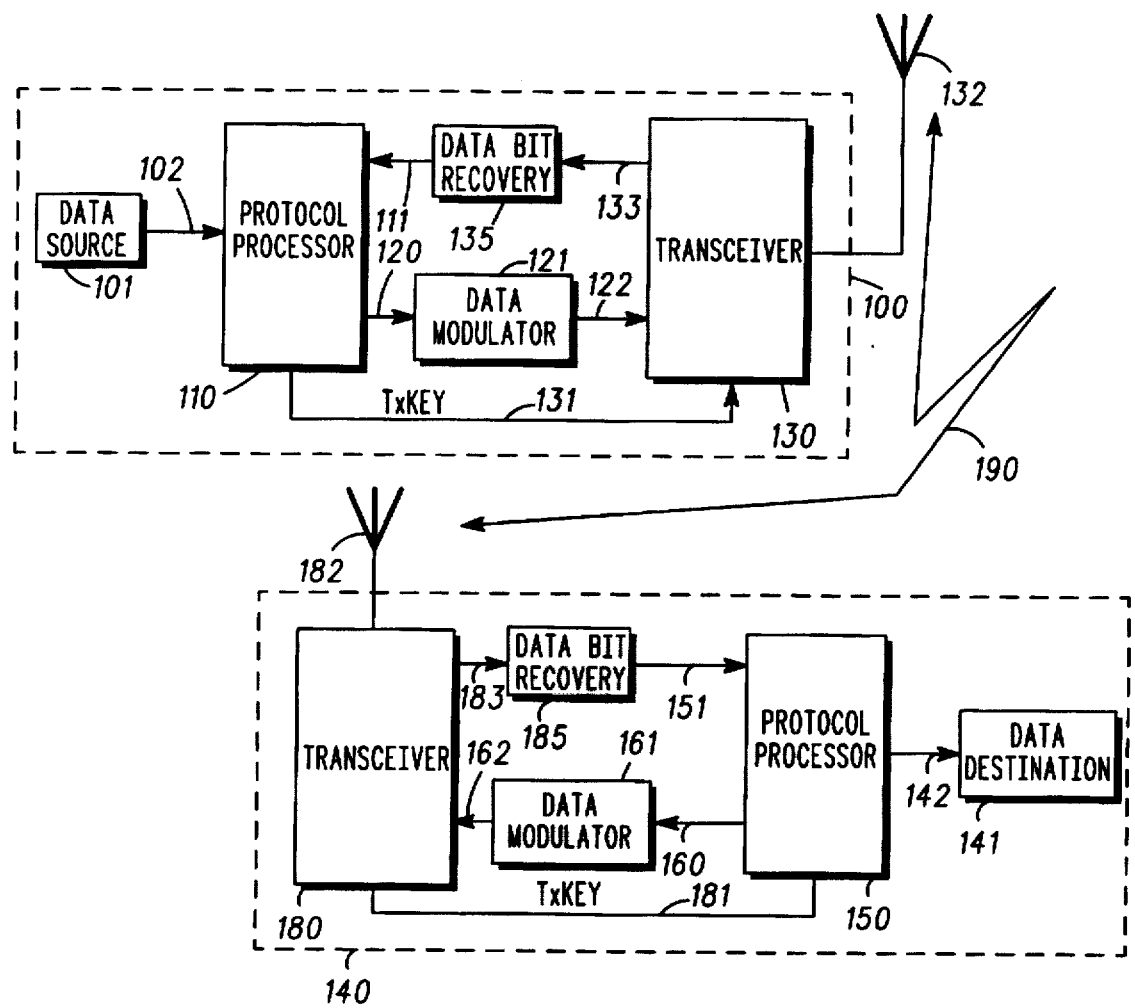
FIG. 1 is a representative diagram of a data communications system operating in accordance with the instant invention.

Referring to FIG. 1 a representative diagram of a data communications system is depicted. The system consists of a Sending Terminal (100), a Receiving Terminal (140), and the Media (190), here being depicted as a wireless radio frequency channel, but could in other embodiments consist of an infrared channel or other technology. Each of the Sending Terminal (100) and Receiving Terminal (140) has the capability of transmitting or receiving data messages over the wireless Media (190). In this depiction information data will be sent from a Data Source (101) in the Sending Terminal (100) to the Receiving Terminal (140), finally ending up at the Data Destination (141). The Data Source (101) and Data Destination (141) pass their respective information data to and from Protocol Processors (110, 150) over some Information Interfaces (102, 142). It is the function of the Protocol Processors (110, 150) to assure that the information data sent from the Data Source (101) is correctly received at the Data Destination (141). As part of their operation, the Receiving Terminal Protocol Processor (150) may need to detect errors in the received data, and signal the Sending Terminal Protocol Processor (110) that the data has been received correctly or not.

The Protocol Processors (110, 150) handle the formatting of Transmit Link Data Frames (at 120) and Transmit Link Control Frames (at 160) to the Data Modulators (121, 161). The Protocol Processors (110, 150) utilize control means (131, 181) to control the keying of the Transceivers (130, 180). Data Modulators (121, 161) perform any processing operations on the Transmit Link Data Frames (120) and Transmit Link Control Frames (160) needed to effectively transmit the frames over the Media (190), these processing operations possibly including but are not limited to bandpass filtering, waveshaping, pre-emphasis filtering, amplitude or angle modulation, etc., which are common methods well known in the art. The output of the Data Modulators (121, 161) are sent over interfaces (122, 162) to Transceivers (130, 180) for transmission over the Media (190). Transceivers (130, 180) handle the actual transmission and reception of the processed frames over the Media (190), using suitable Antennas (132, 182). This embodiment depicts a radio frequency wireless radio frequency Media (190), so the Transceivers (130, 180) and Antennas (132, 182) are suitable for this radio frequency media, but could just as well employ infrared or other technologies suitable to other media. It should also be appreciated by those skilled in the art that the Data Modulator blocks (121, 161) may reside as blocks separate from the Transceivers (130, 180), with distinct interfaces (122, 162) as shown in this embodiment, or be incorporated internally to the respective Transceivers.

Signals received from the Media (190) using Antennas (182, 132) are processed by Transceiver receivers (180, 130) and sent (over 183, 133) to Data Bit Recovery processors (185, 135). The Data Bit Recovery processors (185, 135) attempt to correctly estimate the received Link Data Frames and Link Control Frames, and pass the estimated received frames (over 151 and 111) to the Protocol Processors (150, 110).

Data flow through this data communications system originates at the Sending Terminal (100) with information data at the Data Source (101). This information data is formatted into Transmit Link Data Frames in Protocol Processor (110), processed in the Data Modulator (121), and transmitted by the Transceiver (130) through Antenna (132) over the Media (190). It is received by the Receiving Terminal (140) through Antenna (182), and is processed by Data Bit Recovery processor (185). The resulting Receive Link Data Frames are processed by Protocol Processor (150), with the received information data passed to the Data Destination (141). In response to Receive Data Link Frames, the Receiving Terminal Protocol Processor (150) will generate Transmit Link Control Frames used as feedback to the Sending Terminal Protocol Processor (110) that the information data has, or has not, been received correctly. These Transmit Link Control Frames are generated by the Receiving Terminal Protocol Processor (150), are processed by Data Modulator (161), and transmitted by Transceiver (180), out Antenna (182), over the Media (190). The Transmit Link Control Frames are received by Antenna (132) coupled to Transceiver (130), are processed by Data Bit Recovery processor (135), and passed to Protocol Processor (110), where they are used to signal success or failure of the information data transfer.

Figure 2:
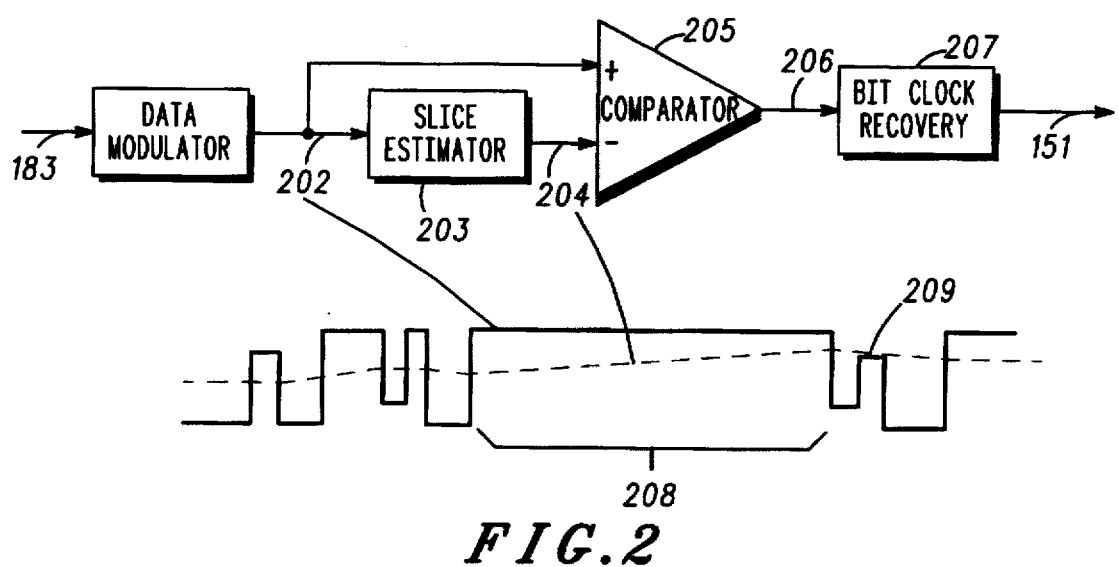
FIG. 2 is a more detailed diagram of a portion of the FIG. 1 system showing the operation of the Data Bit Recovery processor, and illustrating the problems encountered in the bit estimation process when there are long strings of 1's or 0's in the received waveform.

FIG. 2 depicts a more detailed description of the Receiving Terminal Data Bit Recovery processor (185), included here to clarify the problems in data communications systems addressed by this invention. The received waveform output of the Transceiver (180) feeds into the Data Bit Recovery Processor (185) at interface (183). Some sort of demodulation process will then occur within the Data Demodulator (201). This demodulation process may involve discrimination, envelope detection, coherent carrier tracking, or any other of a number of well known techniques. The result of this demodulation process (at 202) is a representation of the received data bit stream where some physical value, e.g. voltage, varies proportionally to the received bit values. This physical value is used by the Slice Estimator (203) to estimate a Reference level (at 204). The varying physical values are then compared against the estimated Reference by the Comparator (205) in order to get the actual level estimate (at 206). The sequence of level estimates are used by Bit Clock Recovery process (207) in order to arrive at the actual received Link Data Frame (at 151).

Depicted also in FIG. 2 is a representation of the receiver demodulated output (at 202), here containing a long string of 1's (over interval 208). This long string of 1's slew the output of the Slice Estimator (203), causing this estimate to ramp up (at 204), causing a bit error (at 209). Long runs of 1's (or 0's) will cause the slice estimate to be in error, leading to a high incidence of bit errors near the run pattern.

Figure 3:
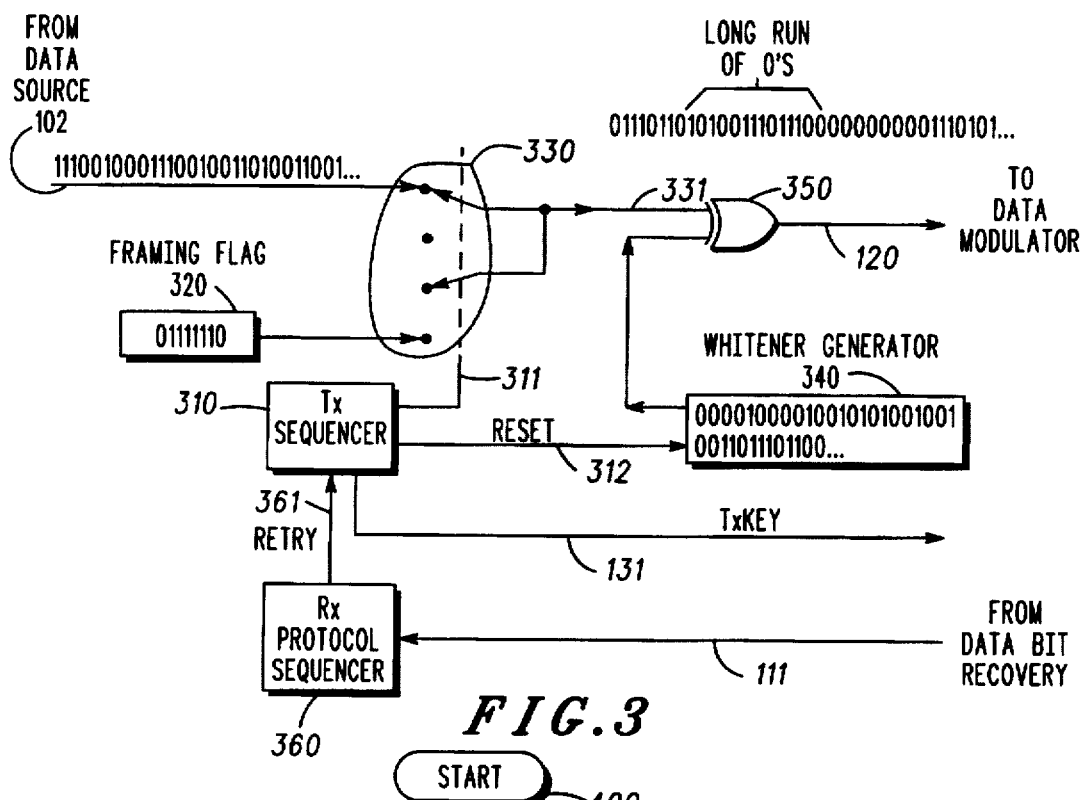
FIG. 3 is a more detailed diagram of a portion of the FIG. 1 system depicted in accordance with a preferred embodiment of the instant invention.

FIG. 3 depicts a portion of Protocol Processor (110). Here a Tx Sequencer (310) provides the control signals for the proper formatting and timing of the Transmit Link Data Frames (at 120). The Tx Sequencer (310) controls Multiplex Switch (330 via 311), for the purpose of inserting Framing Flags (320) into the start of the information data (at 102) from the Data Source (101). This concatenated information data sequence and Framing Flags appears at the Multiplex Switch output (330 at 331). A Framing Flag is a particular sequence of data bits, where the sequence is easily recognized, and is used for the purposes of delimiting Transmit Link Data Frames. Here the particular sequence used is 01111110, commonly used for High-Level Data Link Control (HDLC) framing, but for purposes of this invention could be any easily identified unique sequence extending over a number of bits. HDLC is a bit-oriented protocol defined by the International Standards Organization (ISO) used for international communications. [International Organization for Standardization, Information Processing Systems—Data Communications—High-Level Data Link Control Procedures—Frame Structure, ISO 3309]. It uses a few defined bit patterns for control functions. The six 1's in the 01111110 Framing Flag is guaranteed to be uniquely detectable at the receiver since according to the HDLC protocols, no string of six or more 1's is allowed in the Data Source (101). Since this Framing Flag sequence is easily identified, the receiver Protocol Processor (150) can easily identify the frame delimiters, discard them, and recover the received frame at the proper boundary. The Tx Sequencer (310) also provides the control signal (131) used to key and dekey the Transceiver (130).

The output of the Multiplex Switch (330 at 331) is used as one input to exclusive-OR gate (350), the other input being a pseudorandom Whitener Generator (340). The exclusive-OR gate (350) is used for purposes of modifying in a known predictable manner the concatenated information data stream and flag delimiters. The Whitener Generator (340), being reset by the Tx Sequencer (310 via 312), provides a known sequence of 1's and 0's, whose statistical run length properties are well controlled and mimic the statistical properties of a purely random sequence of 1's and 0's. Statistically the Transmit Link Data Frame at the output of the exclusive-OR gate (350 at 120) should have run lengths substantially similar to a random sequence of 1's and 0's, and therefore should present less of an error at the receiver Slice Estimator (204). However, as shown in this example, the use of the Whitener Generator (340) does not completely preclude long runs of 1's or 0's, only makes them statistically less common. For example, here the concatenated information data stream and Framing Flag, exclusive-Or'd with the Whitener Generator, yields a run of 0's of ten bit times duration.

|  | Flag | Data Source |
|---|---|---|
| Input | 01111110 | 1110010001110010011010011001... |
| Whitener | 00001000 | 0100101001001001011011101100... |
| Result | 01110110 | 1010111011100000000001110101... |

This long run of 0's could potentially lead to the pattern error problem depicted in FIG. 2. If the transmitted Link Data Frame is not received correctly at the receiving Protocol Processor (150), the Protocol Processor will return a negative acknowledgment (or fail to return a positive acknowledgment) Transmit Link Control Frame back to the sending unit. This acknowledgment handshake (or absence of it) will be detected by the sending unit Protocol Processor (110) at the Rx Protocol Sequencer (360), causing a RETRY request (361) to be issued to the Tx Sequencer (310). If the Whitener Generator (340) is reset by the Tx Sequencer (310 via 312) at the same time relative to the start of each Transmit Link Data Frame, this same run of 0's will occur on every subsequent transmission retry, potentially precluding this frame from ever being received without error.

This invention provides for the reliable communication of retries. When the acknowledgment handshake (or absence of it) is detected at the sending unit Rx Protocol Sequencer (360), indicating the need for a retry, the RETRY request (361) is issued to the sending unit Tx Sequencer (310). This invention modifies the operation of the Tx Sequencer (310) to insert one or more extra Framing Flags into the start of the Transmit Link Data Frame. These extra Framing Flags will shift the data bit stream relative to the whitener sequence, resulting in a substantially different pattern of run lengths in the retry Transmit Link Data Frame. This substantially different run length pattern will not cause the same pattern error problem at the receiver. Extra Framing Flags are detected at the receiver and discarded in order to recover the desired data stream. For example, in the above example:

|  | Flag | Flag | Data Source |
|---|---|---|---|
| Input | 01111110 | 01111110 | |
|  | 1110010001110010011010011001... | | |
| Whitener | 00001000 | 01001010 | |
|  | 1001001001101110110000111000... | | |
| Result | 01110110 | 00110100 | |
|  | 0111011000011100101010100001... | | |

Figure 4:
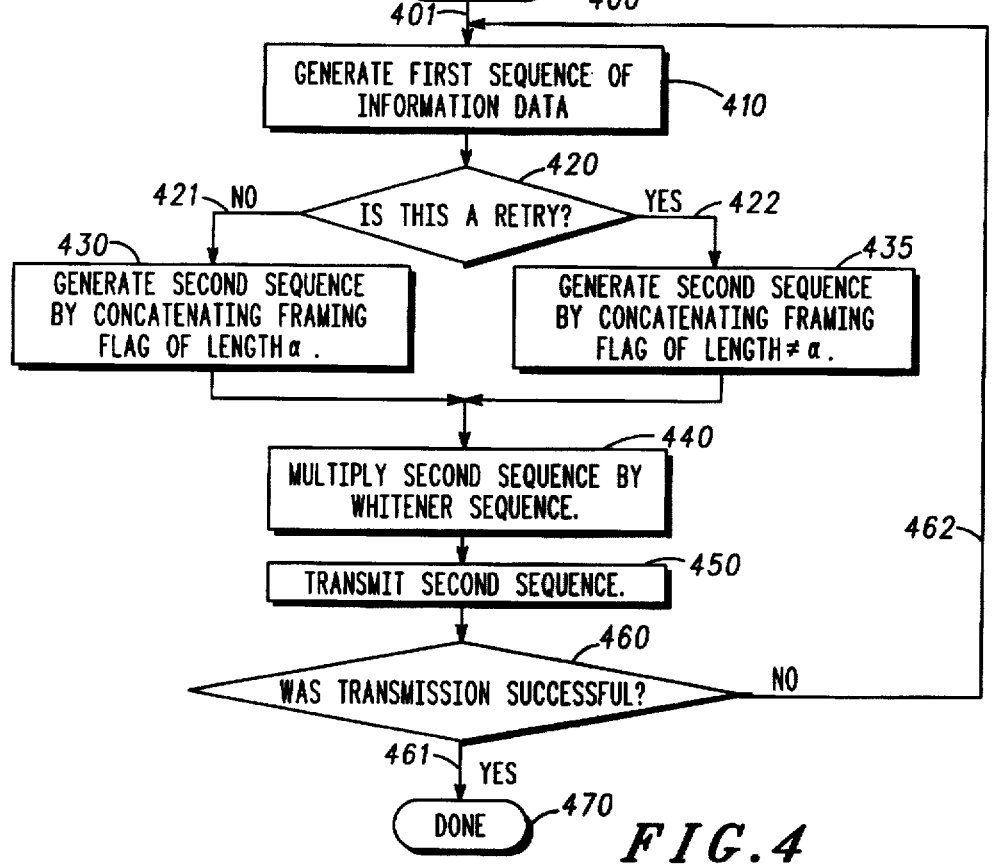
FIG. 4 is a flow diagram illustrating the sequence of operation of FIG. 3 depicted in accordance with a preferred embodiment of the instant invention.

The sequence of operation of the preferred embodiment of the invention in Sending Terminal (100) can best be understood with reference to FIG. 4. Following the Start (400) of the operation, generating process (410) assembles a first sequence of information data. This may involve obtaining a copy of it from the Data Source (101), or performing preliminary formatting operations upon the raw data from the Data Source, or generating the desired sequence of information data by other means. Generating process (410) can be entered by two pathways; either directly from Start (400) via initial path (401); or, from a retry attempt via Retry path (462). Next a decision is made (420) as to whether this is a retry attempt based on the sequence of operation; initial path (401) vs. Retry path (462), or by other means, such as a semaphore flag, retry counter, etc. If this is not a Retry, path (421) will be taken, and generating process (430) will format a second sequence by concatenating a framing flag of length a at the beginning of the first sequence of information data. If this is a Retry, path (422) will be taken, and generating process (435) will format a second sequence by concatenating a framing flag of length not equal to α at the beginning of the first sequence of information data. The second sequence will then be bit by bit multiplied with a known whitener sequence by multiplier process (440), forming the Transmit Link Data Frame (120). This multiplying process (440) may be performed by an exclusive-OR gate (350), or by other suitable means. Transmitting process (450) will then attempt to send this whitened Transmit Link Data Frame to the Receiving Terminal (140) via the Data Modulator (121), Transceiver (130), and Antenna (132). Success determining process (460) will then ascertain the success or failure of the transmission by receiving a Link Control Frame from the Receiving Terminal, timing out on the failure to receive a Link Control Frame, or by other suitable means. If the transmission was successful, the sequence of operation terminates via exit path (461 to 470). If the transmission was unsuccessful, a Retry will be attempted via Retry path (462).

The above described embodiment of the instant invention has disclosed a highly inventive apparatus and procedure for eliminating pattern error on data transmission retries. Other advantages and applications within the true scope and spirit of the instant invention as defined by the appended claims below will become clear to practitioners of the art.

I claim:

1. An apparatus, adaptable to communication failure indications, for eliminating an undesired pattern of physical values of a generated signal, such signal having physical values responsive to a sequence of information data, the apparatus comprising:

a Protocol Sequencer, responsive to said sequence of information data and to said communication failure indications, providing a RESET control signal, and a RETRY control signal;

a Framing Flag Generator, responsive to said RESET control signal, for providing a variable length Framing Flag, where the length of the Framing Flag is dependent on said RETRY signal;

a multiplex switch, responsive to said RETRY control signal and to said RESET control signal; for generating the concatenation of said Framing Flag and said sequence of information data;

a Whitener Generator, responsive to said RESET control signal, for providing a known sequence of values;

a multiplying means, for multiplying said concatenation of said Framing Flag and said sequence of information data with said known sequence of whitener values.

2. A method for eliminating an undesired pattern of physical values of a generated signal, comprising the steps of:

generating a first sequence of information data;

concatenating a variable length framing flag onto said first sequence resulting in a second sequence of data, said framing flag length responsive to a retry control signal; and multiplying said second sequence with a whitener sequence.

* * * * *